United States Patent [19]

Hostetler

[11] Patent Number: 5,062,391
[45] Date of Patent: Nov. 5, 1991

[54] BRACKET FILLER FOR ANIMAL WATERING DEVICE

[75] Inventor: Robert D. Hostetler, Elkhart, Ind.

[73] Assignee: Avtron, Inc., Elkhart, Ind.

[21] Appl. No.: 647,153

[22] Filed: Jan. 29, 1991

[51] Int. Cl.$^5$ .............................................. A01K 39/02
[52] U.S. Cl. .................................................... 119/72
[58] Field of Search .......................... 119/72, 72.5, 75; 248/58, 59, 62, 63, 68.1

[56] References Cited

U.S. PATENT DOCUMENTS

| | | | |
|---|---|---|---|
| 4,221,188 | 9/1980 | Hostetler | 119/72 |
| 4,267,800 | 5/1981 | Keller et al. | 119/72.5 |
| 4,284,036 | 8/1981 | Hostetler | 119/72.5 |
| 4,491,088 | 1/1985 | Hostetler | 119/72.5 |
| 4,637,345 | 1/1987 | Hostetler | 119/72.5 |
| 4,669,422 | 6/1987 | Steudler, Jr. | 119/72 |
| 4,724,797 | 2/1988 | Steudler, Jr. | 119/72 |
| 4,753,196 | 6/1988 | Lack et al. | 119/72 |
| 4,794,881 | 1/1989 | Rader | 119/72.5 |
| 4,884,528 | 12/1989 | Steudler, Jr. | 119/72.5 |
| 4,982,699 | 1/1991 | Momont | 119/72 |

Primary Examiner—Robert P. Swiatek
Assistant Examiner—Todd E. Manahan
Attorney, Agent, or Firm—Jeffers, Hoffman & Niewyk

[57] ABSTRACT

The present invention is a bracket insert for water supply system for fowl and small animals. The system includes hangers which engage a ballast pipe connected to a conduit having a plurality of dispensing valves. The ballast pipe and conduit are connected by a bracket assembly which includes holes in a peripheral wall. To avoid undesirable accumulation of particles within the bracket, a bracket insert is provided which fits within the interior of the bracket assembly and physically blocks passage of any particles through the holes.

20 Claims, 2 Drawing Sheets

BRACKET FILLER FOR ANIMAL WATERING DEVICE

BACKGROUND

1. Field of the Invention

The present invention relates to water supply systems for fowl or small animals. More specifically the field of the invention is that of brackets used for interconnecting elements of an elongate water dispensing assembly.

2. Prior Art

The proper provision of water is essential for safe and efficient nurturing of fowl and small animals, for example in raising chickens. However, problems with the water supply can adversely affect the chickens. Leakage in the water supply system can foster bacteria growth and infection, and left unchecked can flood the hen house and drown the chickens. Therefore, water accumulating on the floors of the hen house should be avoided. In addition, the physical structure of the watering system may include portions which are conducive to undesirable accumulation of dirt and bacteria, particularly with the close proximity of a supply of water.

To accommodate the desire for better water supply, water supply systems exist which include a horizontal supply conduit having dispensers with a housing and a valve clamped to the conduit. These prior art systems utilize plastic bodies and metal parts commonly formed by machining. The machined parts of the valve can wear and an effect of that wear is that the rate of liquid flow through the valve increases, to the point the flow is in excess of what the chicken can ingest. If too much water is dispensed by each valve opening, then the excess water can wet the chicken and wet the litter which fosters bacteria and mold and thereby endangers their lives. The aforementioned wear necessitates replacement or removal of the valves of water supply systems.

A watering system described in U.S. Pat. Nos. 4,284,036, 4,491,088, 4,589,373, and 4,637,345 solves many of the aforementioned problems, and each of these patents is expressly incorporated by reference herein. Referring to FIG. 7, the valve 10 has a tubular body 12 with a tapered lower bore 14. Valve 10 is sealed by a pin 16 having a head 18 resting its lower surface 20 on a rubber cup 22 inside the valve 10. A metal ball 24 sets on the head 18, and three ring seal 26 is formed by head 18 abutting cup 22 and ball 24 abutting two seats 28 of cup 22. Ball 24 is unseated by tilting pin 16 and moving it out of axial alignment with body 12, so that the head lower surface 20 rests only on a small portion of cup 22, and ball 24 is raised to move it out of engagement with seats 28. Only a small amount of water is able to flow through the restricted gaps between ball 24 and cup 22 when pin 16 is tilted, and the droplet so formed flows along pin 16 to its bottom end 30. Pin 16 is a shiny metallic element which attracts the attention of chickens. Normally, a chicken moves pin 16 with its beak, and valve 10 lets a small droplet of water pass so that the chicken can easily consume the droplet as it flows down pin 16.

Valve 10 is mounted on the underside of conduit 32 at predetermined points. Annular flange 34 extends from body 12 and receives O-ring 36 which seals valve 10 to the conduit 32. A lateral projection 38 has a shank 40 with a hook 42 for attaching over a part of an integral section of conduit 32. The conduit 32 is attached to the underside of a ballast pipe 44 by bracket assembly 46 which is sonically welded to the conduit 32. Ballast pipe 44 may be any rigid elongate member, such as a galvanized steel pipe. As depicted in FIG. 2, bracket assembly 46 is bolted to ballast pipe 44 and thus holds conduit 32 in spaced relation below. Fingers 48 at the top of bracket assembly 46 are used to hold an electrically conductive cable.

In FIG. 3, bracket assembly 46 is shown disassembled into upper bracket 50 and lower bracket 52. Lower bracket 52 has a hook 54 on one side for locking with slot 56 of upper bracket 50. Bolt 58 extends through each bracket 50 and 52 on the opposite side of slot 56 and hook 54, and is threadably engaged by nut 60 to couple upper and lower brackets 50 and 52. Semi-circular top surface 66 and semi-circular bottom surface 68 engage and hold ballast pipe 44 when bolt 58 is tightened. Upper bracket 50 also has notches 62 on the peripheral wall 64, with a total of four notches 62 positioned equidistantly around the circumference of wall 64.

To hang the water supply assembly, flexible lines of the suspension system were originally designed to attach through notches 62. A U-hook (not shown) may be used to attach bracket assembly 46 to a flexible line, although the flexible lines can also extend through notches 62. The U-hook is attached to bracket assembly 46 by its ends extending through notches 62, and the flexible lines are then tied to the U-hook. However, notches 62 allow dust and germs to accumulate within upper bracket 50 which may allow germs and disease to foster within and then spread to the animal population. Upper brackets 50 may be cleaned by spraying water into notches 62, however this is a difficult and time consuming task which has only limited effectiveness. Bracket assembly 46 must be disconnected and the interior region 70 exposed and cleared to thoroughly clean upper bracket 50.

Notches 62 are no longer needed to attach to flexible lines of the system. As described in the co-pending application entitled "HANGER FOR WATER SUPPLY SYSTEM AND METHOD OF INSTALLATION", Ser. No. 07/429,226, filed on Oct. 31, 1989, the disclosure of which is explicitly incorporated by reference, the flexible lines can be attached to separate hangers 72. With the use of hangers 72, notches 62 are not needed and only serve to provide a access to interior region 70 so that dust and germs may accumulate. However, many conventional watering systems exist which unnecessarily have notches 62. What is needed is to prevent the undesired accumulation within interior region 70.

SUMMARY OF THE INVENTION

The present invention is an insert for a bracket assembly used with a water supply system for fowl or small animals. The insert blocks the notches in the upper bracket of the bracket assembly so that undesired particles cannot enter and accumulate within the upper bracket. By preventing such accumulation, the upper brackets of the bracket assembly do not require additional cleaning to eliminate the danger of bacteria growth or infection spreading due to the accumulation of material in the interior region of the upper bracket.

The exterior surface of the insert mates with the interior of the upper bracket to provide a secure connection. The insert includes projections which match grooves on the upper bracket interior and guide the projections into the interior and to block the notches. Also, indentations in the top of the insert are automatically aligned with matching support ribs of the upper bracket fingers. With this structure, the top of the upper bracket has a generally planar surface and its frusto-conical peripheral side has a generally smooth surface. The insert completes the surfaces and blocks the passage of particles into the interior of the upper bracket.

The present invention is, in one form, a water supply system for fowl or small animals comprising an elongate ballast pipe, a tubular water supply conduit, a bracket assembly, valves, a suspension system, and a bracket insert. The bracket assembly is for rigidly attaching the conduit to the ballast and includes a peripheral wall defining a hole and an interior region. Valve are connected to the conduit for providing water to the fowl or small animals, and are in fluid communication with the conduit. The suspension system suspends the ballast member and the conduit. The bracket insert is disposed within the bracket assembly and blocks passage of any particles through the hole and into the interior of the upper bracket.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
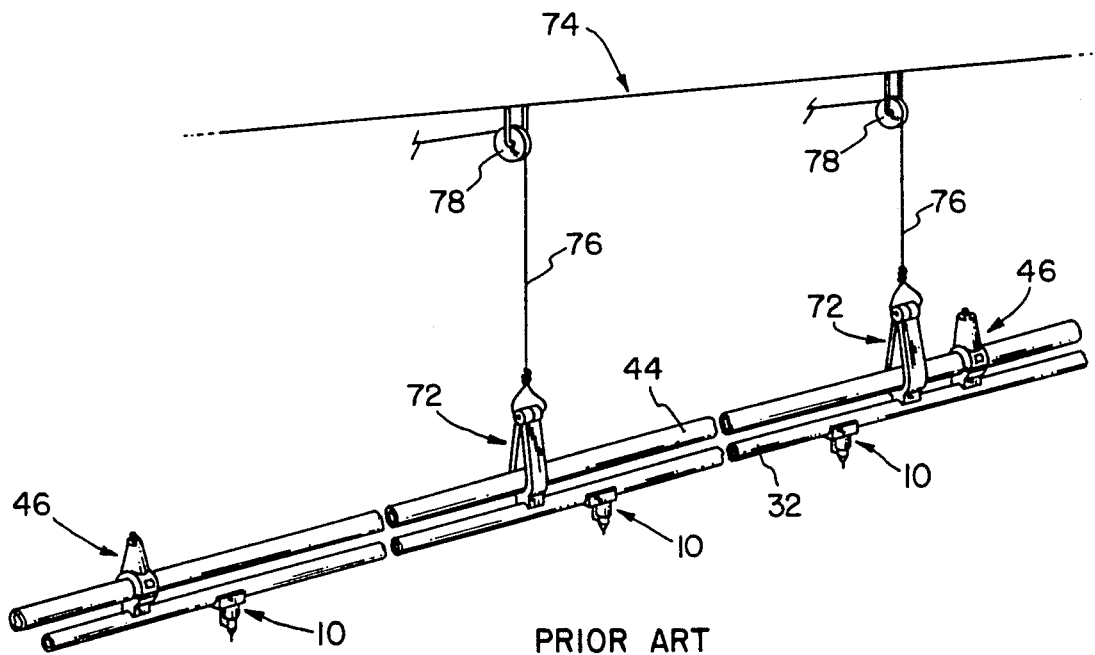
FIG. 1 is a perspective view of a water supply system.
Figure 2:
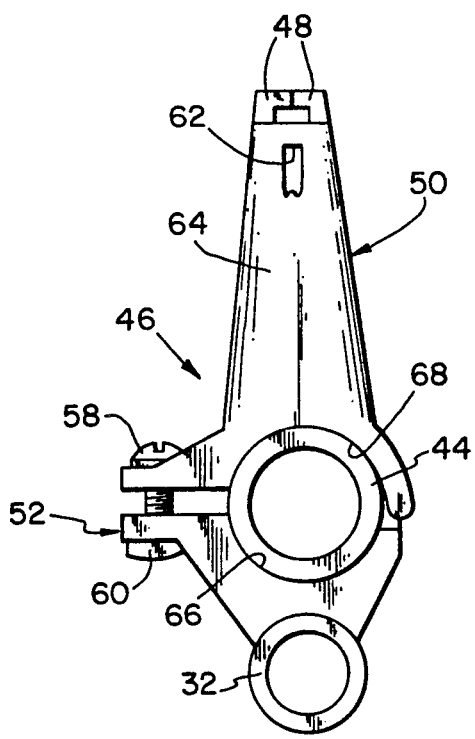
FIG. 2 is an elevational view partially in section of a prior art bracket assembly disposed around a ballast member.
Figure 3:
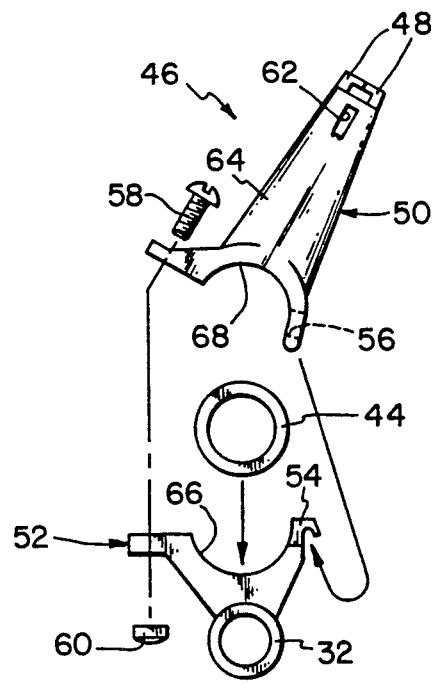
FIG. 3 is an exploded view of the bracket assembly of FIG. 2.

Corresponding reference characters indicate corresponding parts throughout the several views. The exemplifications set out herein illustrate a preferred embodiment of the invention, in one form, and such exemplifications are not to be construed as limiting the scope of the disclosure or the scope of the invention in any manner.

DESCRIPTION OF THE PREFERRED EMBODIMENT

A prior art water supply system is shown in FIG. 1. A plurality of dispenser valves 10 extends from discharge points on conduit 32 for supplying water to the fowl or small animals. Conduit 32 is coupled to a pump pressure regulator (not shown) which provides a supply of pressurized water flow. Bracket assemblies 46 are spaced on conduit 32 and attach to ballast pipe 44. Suspension system 74 comprises flexible lines 76 which extend downwardly from suspension pulleys 78, preferably straight down from each pulley 78 to the respective hanger 72. The flexible lines 76 loop through respective hangers 72 and are tied. A plurality of hangers 72 is positioned at locations along ballast pipe 44 corresponding to the locations of suspension pulleys 78.

Figure 4:
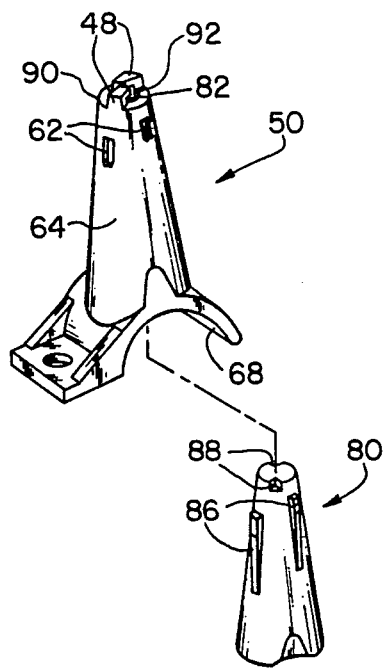
FIG. 4 is a perspective view of the upper bracket and the insert of the present invention.
Figure 5:
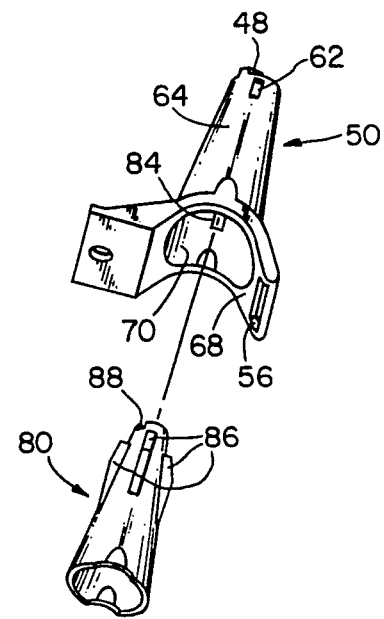
FIG. 5 is a perspective view showing the insertion of the insert into the upper bracket.
Figure 6:
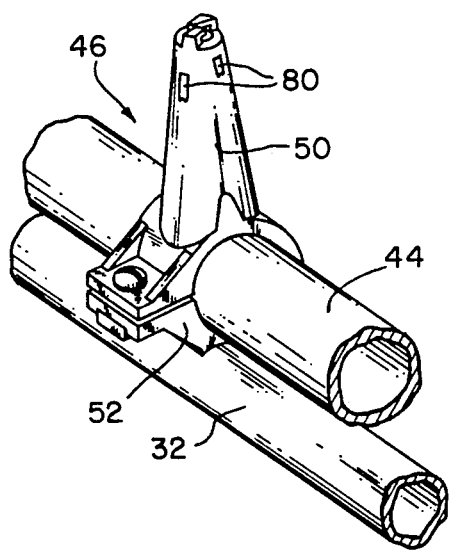
FIG. 6 is a perspective view of the bracket assembly with the insert of the present invention.
Figure 7:
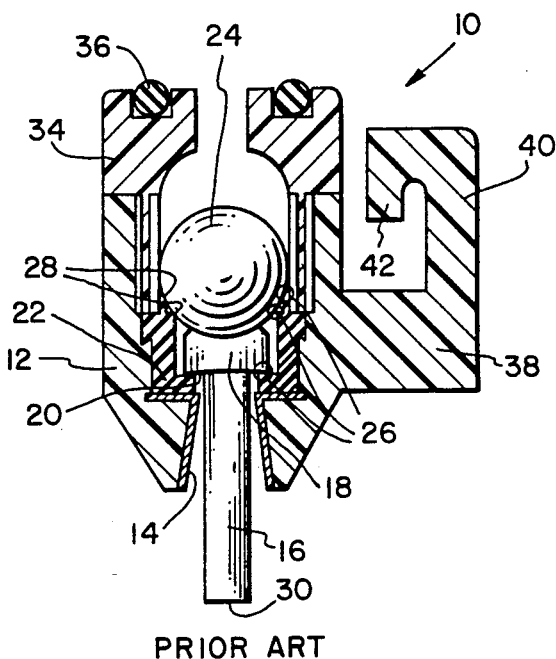
FIG. 7 is a sectional view of a prior art dispenser valve.

In accordance with the present invention, upper bracket insert 80 has a shape which occupies interior region 70 of upper bracket 50 and blocks the entry of particles through notches 62. Referring to FIGS. 4, 5, and 6, insert 80 fits within interior region 70 of upper bracket 50 to block notches 62 and top opening 82. Upper bracket 50 also includes grooves 84 which face interior region 70 and terminate at notches 62. Projections 86 are shaped to fit into grooves 84 and guide insert 80 into interior region 70. One end of projections 86 fits within one of notches 62 to block internal penetration of upper bracket 50.

Also, indentations 88 are located at top 90 of insert 80 to accommodate support ribs 92 which are internal structures for supporting fingers 48. The external surface of insert 80 tightly abuts the inner surface of upper bracket 50. When insert 80 is properly placed within upper bracket 50, top 90 has a generally planar surface with extending fingers 48 and peripheral wall 64 has a generally smooth, frusto-conical surface.

Inserts 80 are easily introduced into upper bracket 50 when not bolted to lower bracket 52 as shown in FIG. 5. For previously assembled systems, each bracket assembly 46 must be decoupled in order to expose interior region 70. For new systems, insert 80 may be securely fitted within upper bracket 50 before attaching bracket assembly 46 to ballast pipe 44. To introduce inserts 80 into upper bracket 50, projections 86 are aligned with corresponding grooves 84 and notches 62 and slide into interior region 70. With grooves 84 guiding insert 80, indentations 88 are automatically aligned with ribs 92. Further, the engagement of grooves 84 and projections 86 provide a force fit which securely holds portions of insert 80 in notches 62 and top opening 82.

Inserts 80 are preferably made of hard, non-abrasive plastic material such as polypropylene and are preferably integrally fabricated by an injection molding process.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and which fall within the limits of the appended claims.

What is claimed is:

1. A water supply system for fowl or small animals, comprising:
   an elongate ballast member;
   a tubular water supply conduit;
   a bracket assembly for rigidly attaching said conduit to said ballast member, said bracket assembly including a peripheral wall defining a hole and an interior region;
   a plurality of valve means on said conduit for providing water to the fowl or small animals, said plurality of valve means in fluid communication with said conduit;
   suspension means for suspending said ballast member and said conduit; and
   a bracket insert disposed within said bracket assembly, said bracket insert blocking passage of any particles through said hole and into said interior region.

2. The water supply system of claim 1 wherein said bracket assembly includes an upper bracket having a frusto-conically shaped body defining said peripheral wall.

3. The water supply system of claim 2 wherein said body defines a groove facing said interior region and terminating at said hole, and said insert includes a projection, said projection extending into said groove and said hole.

4. The water supply system of claim 2 wherein said upper bracket includes a top opening and two fingers extending above said top opening, said fingers having support ribs extending below said top opening and into said interior region, and said insert includes an upper portion having indentations shaped to receive said support ribs and block said top opening.

5. The water supply system of claim 2 wherein said upper bracket includes four notches circumferentially spaced around said peripheral wall, and said insert includes four projections which extend into said four notches.

6. The water supply system of claim 5 wherein said upper bracket includes four grooves in communication with said interior region, said four grooves extending to a respective one of said four notches.

7. A water supply system of claim 1 wherein said bracket insert is integrally fabricated of resilient plastic.

8. A water supply system for fowl or small animals, comprising:
   tubular conduit means for supplying water;
   a plurality of dispenser valve means for dispensing water to the fowl or small animals, said plurality of dispenser valve means coupled to said conduit means;
   an elongate ballast member for supporting said conduit means;
   a bracket assembly for rigidly attaching said conduit to said ballast member, said bracket assembly including a peripheral wall defining a hole and an interior region;
   suspension means for suspending said ballast member and said conduit means, said suspension means including a plurality of flexible lines extending downwardly and a plurality of hanger members coupled to respective ones of said flexible lines, said hanger members suspending said ballast member; and
   a bracket insert disposed within said bracket assembly, said bracket insert blocking passage of any particles through said hole and into said interior region.

9. The water supply system of claim 8 wherein said bracket assembly includes an upper bracket having a frusto-conically shaped body defining said peripheral wall.

10. The water supply system of claim 9 wherein said body defines a groove facing said interior region and terminating at said hole, and said insert includes a projection, said projection extending into said groove and said hole.

11. The water supply system of claim 9 wherein said upper bracket includes a top opening and two fingers extending above said top opening, said fingers having support ribs extending below said top opening and into said interior region, and said insert includes an upper portion having indentations shaped to receive said support ribs and block said top opening.

12. The water supply system of claim 9 wherein said upper bracket includes four notches circumferentially spaced around said peripheral wall, and said insert includes four projections which extend into said four notches.

13. The water supply system of claim 12 wherein said upper bracket includes four grooves in communication with said interior region, said four grooves extending to a respective one of said four notches.

14. The water supply system of claim 8 wherein said bracket insert is integrally fabricated of resilient plastic.

15. A water supply system for fowl or small animals, comprising:
   an elongate ballast member;
   a tubular water supply conduit;
   a bracket assembly for rigidly attaching said conduit to said ballast member, said bracket assembly including an upper bracket having a peripheral wall defining four notches, a top opening, and an interior region;
   a plurality of valve means on said conduit for providing water to the fowl or small animals, said plurality of valve means in fluid communication with said conduit;
   suspension means for suspending said ballast member and said conduit; and
   a bracket insert disposed within said bracket assembly, said bracket insert having four projections which engage said four notches and having a top portion which engages said top opening, said bracket insert blocking passage of any particles through said hole and into said interior region.

16. The water supply system of claim 15 wherein said upper bracket has a frusto-conically shaped body defining said notches.

17. The water supply system of claim 16 wherein said body defines four grooves, each of said grooves facing said interior region and terminating at a respective one of said notches, and said projections extend into respective ones of said grooves and said notches.

18. The water supply system of claim 15 wherein said upper bracket includes a top opening and two fingers extending above said top opening, said fingers having support ribs extending below said top opening and into said interior region, and said insert includes an upper portion having indentations shaped to receive said support ribs and block said top opening.

19. The water supply system of claim 18 wherein said upper bracket and said bracket insert form a generally planar surface and a generally smooth, frusto-conical surface over said peripheral wall.

20. The water supply system of claim 15 wherein said bracket insert is integrally fabricated of resilient plastic.

* * * * *

UNITED STATES PATENT AND TRADEMARK OFFICE
CERTIFICATE OF CORRECTION

PATENT NO. : 5,062,391

DATED : November 5, 1991

INVENTOR(S) : Robert D. Hostetler

It is certified that error appears in the above-identified patent and that said Letters Patent is hereby corrected as shown below:

Claim 15, column 6, line 39, delete "hole" and substitute therefor --top opening and said notches--.

Claim 18, column 6, line 49, delete "a" and substitute therefor --said--.

Signed and Sealed this

Twenty-third Day of March, 1993

*Attest:*

STEPHEN G. KUNIN

*Attesting Officer*      Acting Commissioner of Patents and Trademarks